United States Patent [19]
Bibl et al.

[11] 4,030,033
[45] June 14, 1977

[54] METHOD AND APPARATUS FOR TRANSMITTING MESSAGES TO AND FROM REMOTE LOCATIONS

[75] Inventors: Klaus Bibl, Belmont; Bodo W. Reinisch, Bedford, both of Mass.

[73] Assignee: Lowell Technological Institute Research Foundation, Lowell, Mass.

[22] Filed: June 13, 1975

[21] Appl. No.: 586,538

[52] U.S. Cl. .................................. 325/30; 325/40; 325/56; 325/63
[51] Int. Cl.² .......................................... H04B 7/02
[58] Field of Search ................. 325/30, 35, 40, 41, 325/42, 56, 63, 66, 311; 178/66 R, 67

[56] References Cited
UNITED STATES PATENTS

| | | | |
|---|---|---|---|
| 3,335,409 | 8/1967 | Heller et al. | 325/40 X |
| 3,423,729 | 1/1969 | Heller | 325/41 X |
| 3,617,889 | 11/1971 | Rabinowitz | 325/56 |
| 3,781,794 | 12/1973 | Morris | 325/56 |

*Primary Examiner*—Benedict V. Safourek
*Attorney, Agent, or Firm*—Pearson & Pearson

[57] ABSTRACT

A method and apparatus for transmitting a message, in digital form, to or from a remote location. In a transmitter, a sequence of predetermined multiple-bit phase codes corresponding to the individual characters in the message phase modulate a carrier wave which also shifts frequency. At a receiving station, the various modulated carrier waves propagated through a dispersive medium constitute incoming signals with both frequency and range diversity. The receiver transforms the incoming signals into a sequence of quadrature component signals which it correlates with the multiple-bit phase code sequences to yield the digital representation of a transmitted message character at the receiving station.

14 Claims, 8 Drawing Figures

BIT NUMBER

| Sequence Number | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|
| 1 | 1 | 1 | 1 | 1 | 0 | 0 | 1 | 0 | 0 | 1 | 0 | 1 | 0 | 0 | 0 | 1 |
| 2 | 1 | 1 | 1 | 1 | 0 | 0 | 1 | 0 | 1 | 0 | 0 | 0 | 1 | 0 | 0 | 1 |
| 3 | 1 | 1 | 1 | 0 | 1 | 0 | 1 | 1 | 0 | 0 | 0 | 0 | 1 | 0 | 0 | 1 |
| 4 | 1 | 1 | 1 | 1 | 0 | 0 | 0 | 1 | 0 | 1 | 0 | 0 | 1 | 0 | 0 | 1 |

FOUR 16 POSITION PHASE CODE SEQUENCES

16 BIT PHASE CODE AUTOCORRELATIONS

16 BIT PHASE CODE CROSS CORRELATIONS

METHOD AND APPARATUS FOR TRANSMITTING MESSAGES TO AND FROM REMOTE LOCATIONS

BACKGROUND OF THE INVENTION

This invention generally relates to the transmission of messages between remote locations and more specifically to the transmission of such messages by means of a modulated carrier wave.

There are several well-known methods and apparatus for transmitting messages, especially messages in digital form, between two locations. In data processing systems, for example, such messages are transferred over conventional or specially adapted telephone lines, over microwave transmission systems and even by means of satellite communications systems. Each system, however, requires a substantial investment at each location. Thus, these systems link geographical centers of some significant population on the supposition that a sufficient number of customers will use the system and justify its expense.

When it is desirable to transmit a message to a geographically remote, sparsely populated location, it is not possible to justify these systems. In such situations, radio systems are used subject to certain operating limitations. Although they are relatively inexpensive systems, various disadvantages detract from their universal acceptance as communications systems in these applications. For example, anyone can copy a message even though that person is not intended to receive the message. Although message scrambling can overcome this problem, the overall expense of the system increases.

When a receiver responds to a carrier wave which is propagated by means of a ground wave or is received along a line of sight, the received signal is very reliable. Unfortunately, these propagation paths are effective only for limited distances. If a message must be transmitted over a greater distance, such a radio system must rely on a propagation medium which includes the ionosphere. However, this medium is very noisy under disturbed conditions which exist during auroras and magnetic storms. Moreover, the reflective characteristics of the ionosphere constantly change as the height of the ionosphere and its critical frequency vary. The critical frequency is that frequency above which a carrier wave does not reflect from the ionosphere. With a fixed transmitting station, it is not possible to predict where a reflected carrier wave of a given frequency will intercept the surface of the earth, when it will arrive or even if the ionosphere will reflect the carrier wave at all. Thus, even though such radio systems might appear to be attractive economically, they are not widely used to obtain reliable communications between fixed locations at any time.

Other communications media are also subject to the same or similar conditions which detract from their use as reliable propagation media for carrier waves. Such media include, by way of example, the troposphere, power cables and power lines and acoustical underground paths. All these media can be classified as highly noisy, variable delay propagation media.

Therefore, it is an object of this invention to provide a method and apparatus for enabling the reliable transmission of messages by means of such highly noisy, variable delay propagation media.

Another object of this invention is to provide a reliable message transmitting method and apparatus for highly noisy, variable delay propagation media which is economical to implement.

Yet another object of this invention is to provide an economical method and apparatus for transmitting messages using the ionosphere as the propagation medium.

SUMMARY OF THE INVENTION

In accordance with this invention, a message comprising a series of characters (i.e., letters, numerals and symbols) is transformed into a series of multiple bit phase code sequences which control the modulation of a carrier signal. The frequency of the carrier signal, itself, shifts after certain fixed or random time intervals, so the transmitted signal has frequency diversity. A receiver samples incoming signals which arrive after varying time delays in the propagation medium to obtain sets of signals representing, for each of the predetermined delay, or range, periods, a received phase code sequence. All the signal sets for each received code sequence are correlated against the known phase code sequences, which are stored in the receiver, to select one such stored phase code sequence and corresponding character as the received character.

The use of a receiver which is sensitive to an incoming signal which has both range and frequency diversity reduces the time that the propagation medium must be coherent. For example, at a transmission rate of 400 Hz for each bit in phase code sequence, the propagation medium need be coherent for 40 milli-seconds to establish reliable communications. This characteristic greatly enhances the reliability of the overall system and provides an economically justifiable communications system.

This invention is pointed out with particularity in the appended claims. The above and further objects and advantages of this invention may be appreciated more fully by referring to the following description taken in conjunction with the accompanying drawings.

DESCRIPTION OF AN ILLUSTRATIVE EMBODIMENT

In the following description like numerals refer to like elements throughout.

Figure 1:
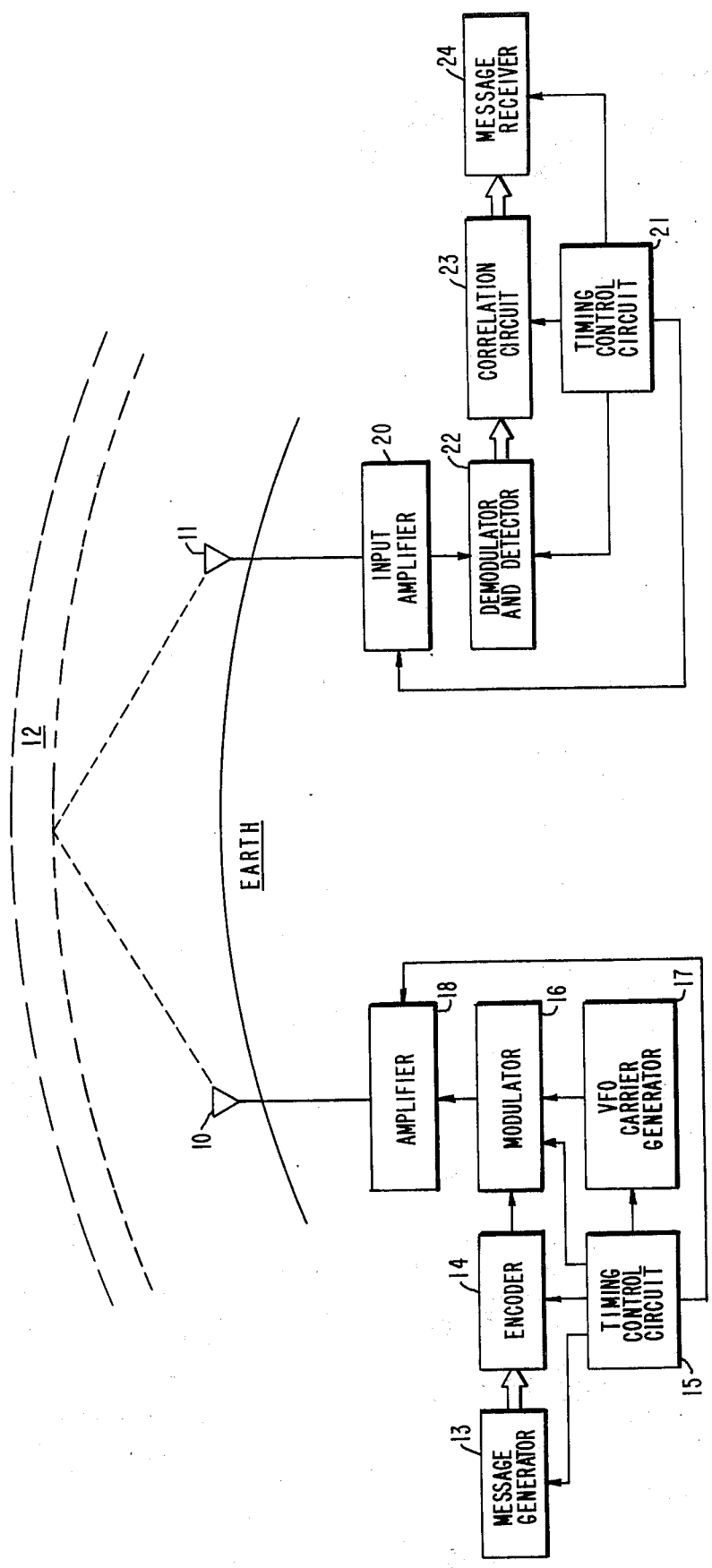
FIG. 1 is a generalized block diagram of a message communications system constructed in accordance with this invention.

FIG. 1 depicts two radio stations at remote locations on the earth represented by a transmitting antenna 10 and a receiving antenna 11 at fixed locations. It is assumed that neither ground wave nor line-of-sight propagation between these locations is possible so the antenna 11 must receive carrier waves reflected from the ionosphere, represented as a layer 12 above the earth.

FIG. 1 depicts the ionosphere as a discrete layer for purposes of this explanation. As previously indicated, it is not because the critical frequency and altitude at which a carrier wave at a particular frequency reflects from the ionosphere both vary with time and independently of each other. Moreover, the variations tend to be random, so it is not possible to predict exactly the frequency of a carrier wave which, at any given time, will reflect to antenna 11. However, a carrier wave of some frequency in the range up to about 16 MHz generally will reflect to antenna 11.

For this reason the transmitter connected to the antenna 10 transmits a carrier wave characterized by its frequency diversity. More specifically, a message generator 13 receives from some external device (not shown) or generates internally a message comprising a sequency of discrete characters. A character code (e.g., normally a 6-bit code) selects from an encoder 14 under the control of timing signals from a timing control circuit 15 a multiple-bit phase code sequence corresponding to the character. The timing control circuit 15 shifts the phase code sequence to a modulator 16 which also receives a carrier signal from a VFO carrier generator 17. An amplifier 18 drives the antenna 10 with the modulated carrier wave from the modulator 16.

Circuits for performing all these functions or readily adapted for performing these functions are well known in the art. For example, the modulator 16 can comprise a conventional phase encoding modulator which shifts the carrier phase by 0° or by 180° in response to each bit in the phase code sequence from the encoder 14. The timing control circuit 15 shifts the frequency of the carrier signal from the VFO carrier generator to achieve frequency diversity. In one embodiment, for example, the timing control circuit 15 shifts the carrier signal to a different one of ten frequencies in each Megahertz band of a total range of 16 Megahertz every 2 seconds. The amplifier 18 can comprise a pulse keyed amplifier to drive the antenna 10 with an output pulse of the phase modulated carrier wave which corresponds to each bit in the phase code sequence; that is, if the phase code sequence has 16 bits, the amplifier 18 drives the antenna with a succession of 16 modulated carrier wave pulses for each character in the message. In one embodiment the amplifier 18 produces a 100 microsecond pulse every 2.5 milliseconds.

The antenna 11 receives an incoming modulated carrier wave having both frequency and range diversity. As previously indicated, the transmitter introduces the frequency diversity. The propogation medium, including the ionosphere, introduces range diversity because the distance any pulse from the antenna 10 travels before reaching the receiving antenna is not known. A maximum range can be set in terms of a time delay, and this is a factor which determines the interval between the successive pulses from the amplifier 18. In accordance with this invention, this total delay or range is divided into subintervals which represent successively larger ranges. In the following discussion, we designate each such subinterval as a "range bin".

At the receiving station, the antenna 11, an input amplifier 20, tuned to the proper carrier frequency by a timing control circuit 21, heterodynes the incoming carrier wave from the antenna 10. A demodulator and detector 22 receives the heterodyned signal and a strobing signal from the timing control circuit 21 to produce a sequence of signals representing information from the demodulated carrier wave for each range bin. A correlation circuit 23 receives these information signals and selects a character code based upon a correlation technique, such as the technique described later or some other correlation technique. The selected character code corresponds to the transmitted character in the message.

Figure 2:
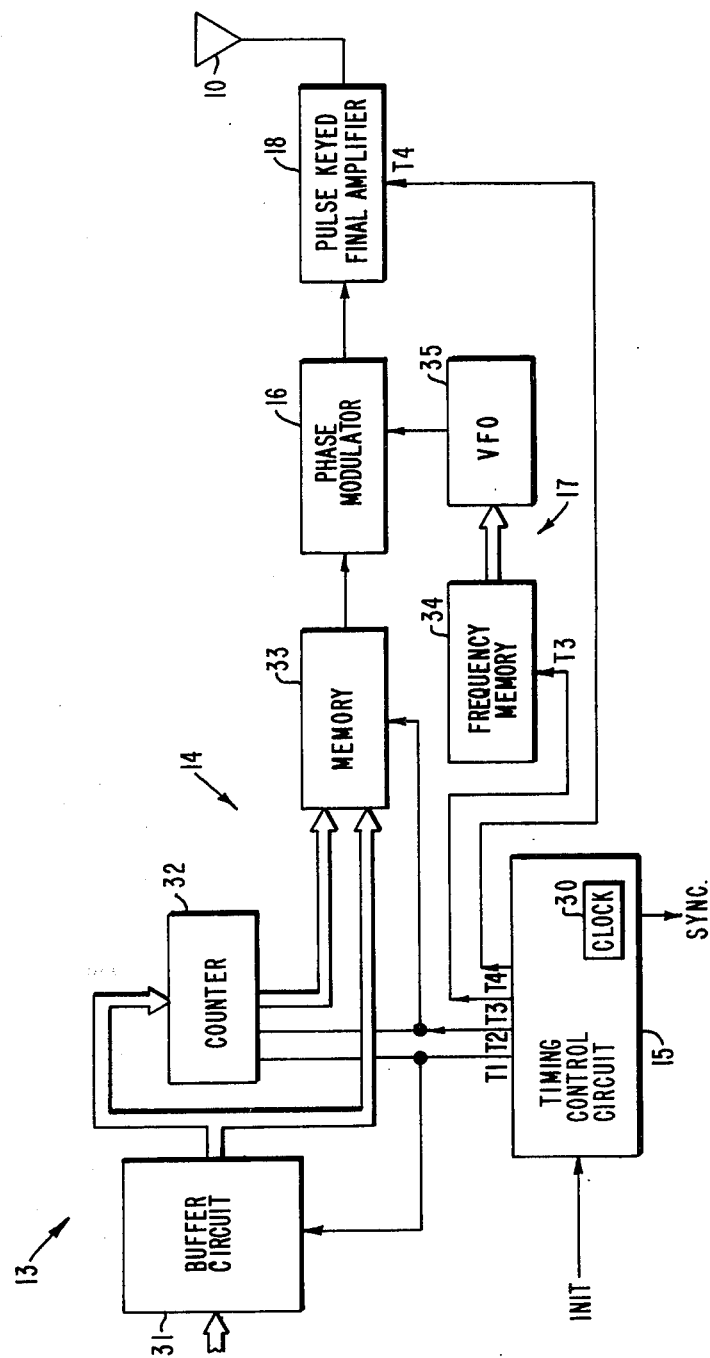
FIG. 2 is a block diagram of the transmitter shown in FIG. 1.

Now referring to FIG. 2, the timing control unit 15 includes a conventional clock 30 for establishing the starting time for a message transmission in response to an INIT signal indicating that a transmission is to occur. Each T1 pulse from the timing control circuit 15 shifts a new character code into a buffer circuit 31. In response to each such character code, a counter 32 and memory 33 issue to the modulator 16, in series each bit in the corresponding phase code sequence.

Figures 3A, 5:
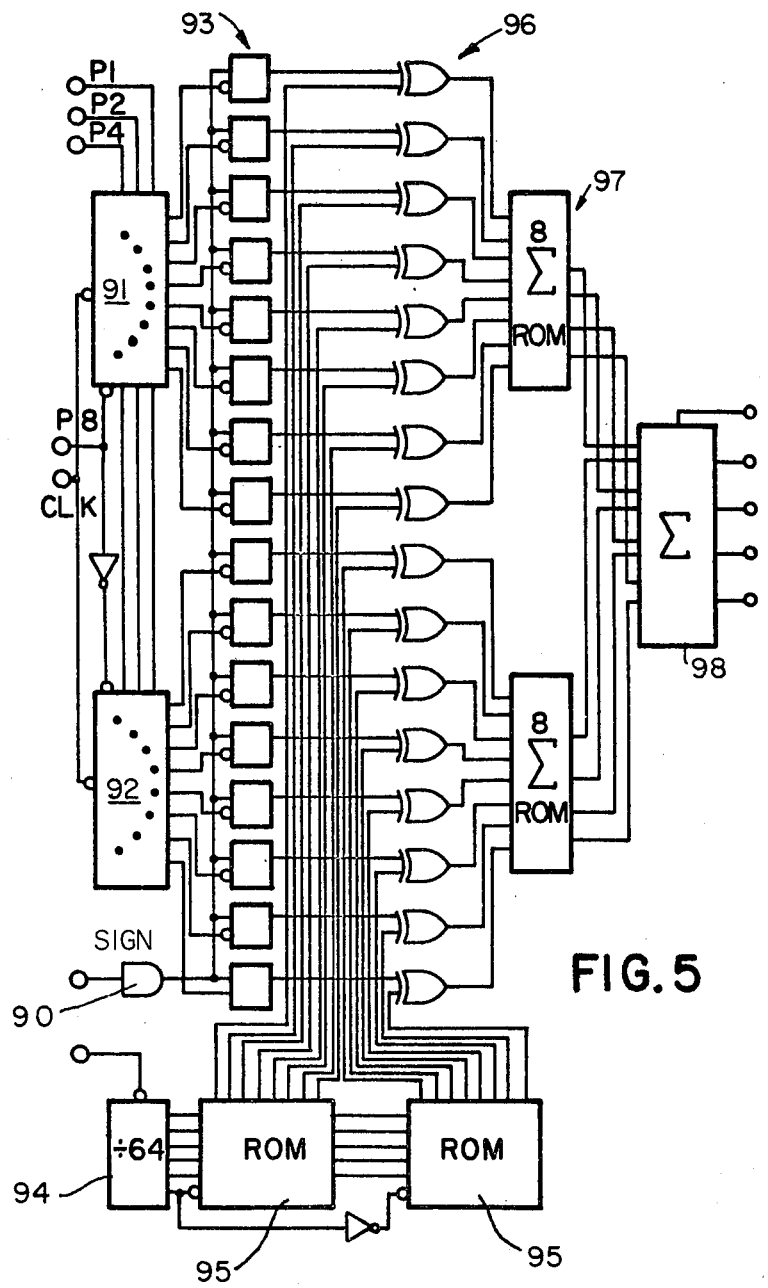
FIG. 5 depicts an alternate portion of a correlation circuit for use in the correlation circuit shown in FIG. 4B.

Still referring to FIG. 2, in one specific embodiment, there are 64 possible characters, and each character has a 2-bit binary character code which the buffer circuit 31 receives on the leading edge of the T1 pulse. Four bits preset the counter 32 (with a modulus of 16) on the trailing edge of the T1 pulse. The remaining two bits from the buffer circuit 31 designate a block of phase code locations while the counter 32 controls the starting point in that block. Moreover, if the memory 37 is a 1 bit by 64 word memory, four different 16-bit phase code sequences such as shown in FIG. 3A, could be stored in locations 000000 through 001111, 010000 through 011111, 100000 through 101111 and 110000 through 111111. With proper code sequences, each sequence can be shifted 15 times to produce 15 additional phase code sequences. Thus, if the sequence for a particular character code is taken from Sequence No. 2 beginning at bit No. 3, the counter 32 would be preset to 0010 (assuming the value "0000" selects Bit No. 1) and the other two bits fed directly to the memory from the buffer circuit 31 would be "01" (assuming a value "00" designates Sequence No. 1). Then, the addresses would advance from 010010 through 011111 and from 010000 through 010001 to transfer Bit Nos. 3 through 16, 1 and 2, in that sequence, to the phase modulator 16.

At the end of each sixteen-bit sequence, the timing and control circuit 15 issues another T1 pulse to load another character code into the buffer circuit 31.

In some embodiments where the receiver includes circuits for preselecting information signals for a fraction of the received range bins, the timing and control circuit 15 issues a SYNC signal each time it changes the frequency of the carrier from the VFO carrier generator 17. The SYNC loads a predetermined one of the character codes into the buffer circuit 31 as a reference code and inhibits a next character code in the message. The use of this reference code is described later.

Figure 3B:
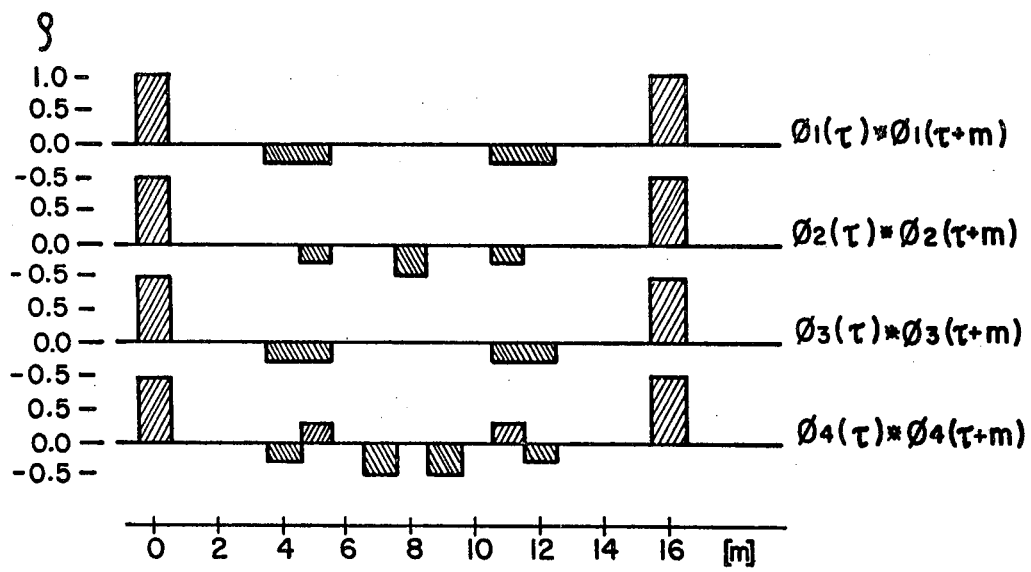
FIG. 3 comprises FIGS. 3A, 3B and 3C which depict, respectively, the phase code sequences, the autocorrelation characteristics of these code sequences and the cross-correlation characteristics of these code sequences.
Figure 3C:
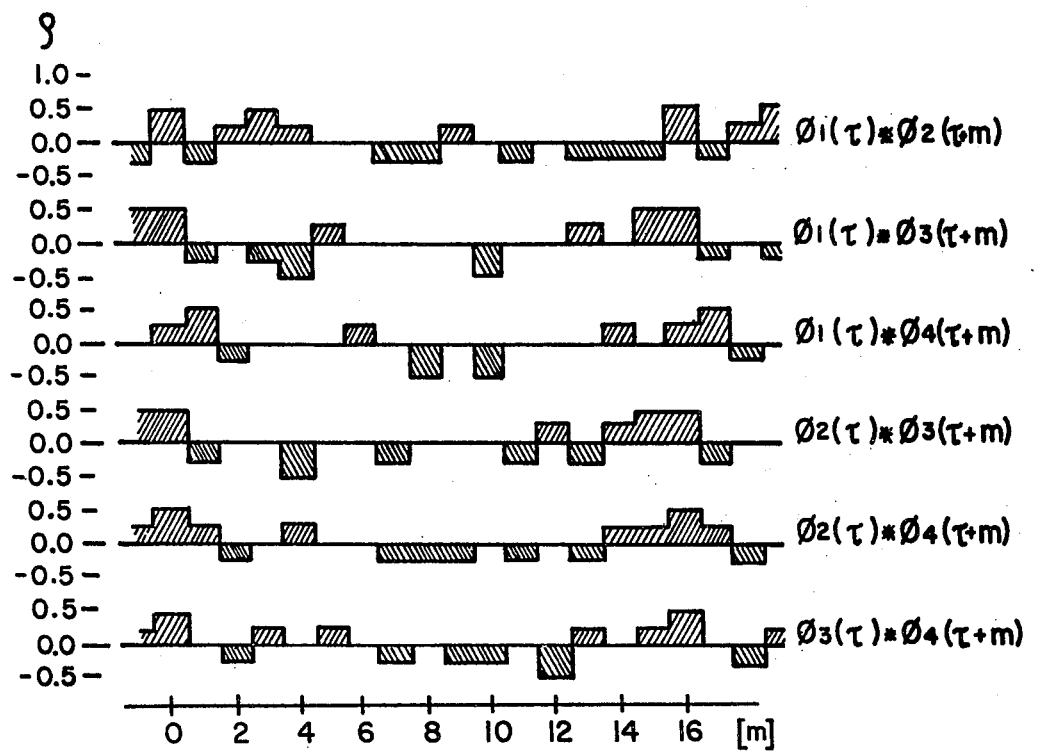

Referring again to FIG. 3A, the four 16-bit phase code sequences have certain desirable characteristics. As shown in FIG. 3B, each sequence has a low correlation in all 15 shifted positions. A correlation which is less than 0.5 is a low correlation. Likewise, FIG. 3C illustrates the cross-correlations between the different sequences. These cross correlations are always low also. Referring again to FIG. 3B, there is a zero correlation for each sequence for the first three shifted positions. This is an important characteristic; it allows the receiver to measure echo ranges corresponding to delays of more than the period between successive pulses from the amplifier 18 without ambiguity because the receiver can cancel echoes from unwanted ranges.

Certain other characteristics of the phase code sequences are important. In this specific phase code with an equal number of positions designating positive (i.e., "1") and negative (i.e., "0") phases, no more than five consecutive positions have the same phase. This assures that the correlation is zero after one shift. To maintain a zero correlation for three shifts, there must be at least a group of four consecutive positions having the same phase.

Each time a phase code sequence has a portion of five positions of consecutive identical phases, at least two positions of opposite phase must exist on both sides of that portion. For example, in Sequence No. 1, Bit Nos. 16 and 1 through 4 have the same positive phase while each of Bit Nos. 5 and 6 and 13 through 15 have a negative phase. For the remaining seven bit positions, two positions of positive phase must be two bit positions apart. This compensates for the loss of one coincidence at the group of five positions of positive phase at the second shift. Moreover, two bit positions of positive phase must have three positions of negative phase between them. With these requirements, there are only three possible positions with a group of five consecutive positions of the same phase: namely, Sequence No. 1 with three positions of negative phase preceding the group of five positions of positive phase and the inverse, Sequence No. 4, with three positions of negative phase following the group of five positions of positive phase; and Sequence No. 2, with the third phase code sequence with five consecutive positions of positive phase. Sequence No. 2 can not be inverted like Sequence No. 1 because it would be too close to one of the other sequences. Sequence No. 3 does not have five consecutive positions of the same phase. However, it does satisfy the requirement that it exhibits a correlation of 0 in the first three shifts and a low correlation in all other shifted positions as well as a low cross correlation with the other three sequences.

Although the foregoing phase code sequences shown in FIG. 3A provide 64 phase code sequences which correspond individually to each of the 64 characters, larger codes can be used, provided that the basic requirement of a zero correlation for one and two shifts is maintained. The only further requirement is that subcodes be taken by dividing the basic code at the center of a sequence of two positions of negative phase and four positions of positive phase. This automatically assures a zero correlation over the first three shifts of the subcode.

With this understanding of the 64 potential 16 bit phase code sequences which the memory 33 stores, it can be seen that the circuit in FIG. 2 provides a simple means for selecting one such code sequence without any need for extensive storage. However, a 16 bit by 64 word memory could store all the phase code sequences to generate all the bits for a character in parallel. Further, it will be appreciated that "1's" and "0's" can cause the phase modulator to shift the carrier signal by 0° or 180° respectively or vice versa.

To provide the frequency diversity, the timing control circuit 15 transmits a T3 signal. In response to each T3 signal a frequency memory 34 selects another frequency for the carrier signal which a VFO 35 generates. Such VFO carrier generators 17 are well known in the art. The T3 signal may be random or periodic. In addition, the frequency memory 34 may select predetermined frequencies in an ordered sequence or in a random sequence. A random sequence, however, does tend to reduce interference with other transmissions and also provides a certain measure of security.

Figure 4A:
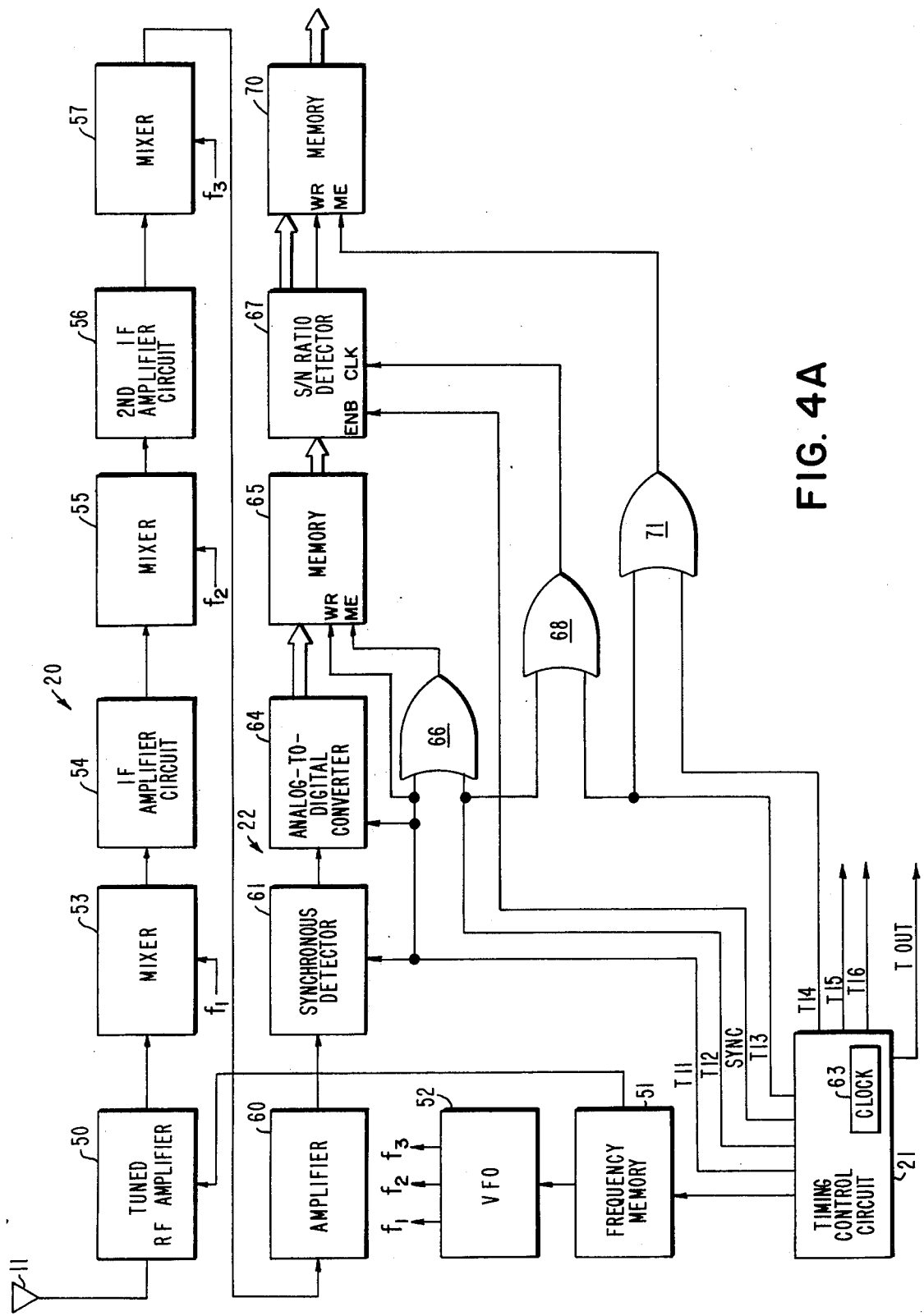
FIG. 4 comprises FIGS. 4A and 4B which are block diagrams of the receiver shown in FIG. 1.

FIG. 4 discloses one specific embodiment of the receiver shown in FIG. 1. In FIG. 4A, the input amplifier 20 comprises tuned amplifiers and mixers in circuit between the antenna 11 and the demodulator and detector 22. Specifically, an RF amplifier 50 receives the signal from the antenna 11. A frequency memory 51 and the timing and control circuit 21 are analogous to the timing control circuit 15 and the frequency memory 34 in FIG. 2 and produce an identically timed sequence of frequency shifts for the incoming signal. Thus, the memory 51 in FIG. 4A tunes the RF amplifier 50 and selects an appropriate heterodyning oscillator signal ($f1$) from a variable frequency oscillator (VFO) 52. A mixer 53 receives the amplified carrier wave and the $f1$ signal to produce a signal at an intermediate frequency (IF) which an IF amplifier circuit 54 couples to a second mixer 52. A fixed signal at frequency $f2$ from the oscillator 52 and the IF signal from the amplifier circuit 54 combine in a mixer 55 to obtain a second IF signal which a second IF amplifier 56 couples to a third mixer 57. The mixer 57 combines this IF signal with a third signal ($f3$) at a fixed frequency thereby to generate an information signal which represents the phase modulation. However, the information represents reflections which occur in all the range bins for each pulse transmitted from the antenna 10 in FIGS. 1 and 2. A synchronous detector 61 (FIG. 4A) in the demodulator and detector 22 receives the signal from amplifier 60 under the control of a timing control circuit 21, which contains a clock 63 like the clock 30 in the timing control circuit 15 in FIG. 2.

More specifically, the timing control circuit 62 generates at delays corresponding to each range bin, a pair of T11 decoding pulses which are in quadrature. These T11 pulses are fed to a synchronous detector 61 to strobe the incoming signal. As a result, a succession of fixed-width, variable complex amplitude pulses appear at the output of the synchronous detector 61. These pulses represent, for each range bin, the amplitude and direction of the successive sine and cosine components of the signal from the amplifier 60. In one embodiment, the timing control circuit 21 transmits 128 pairs of T11 fixed width pulses, and the pulses in one pair are 2.5 microseconds apart. Thus, the synchronous detector 61 issues 128 pairs of sine and cosine signals for each of 128 range bins for each carrier wave pulse from the amplifier 18 in FIG. 2.

An analog-to-digital converter 64 generates a binary number for each sine and cosine signal which a memory 65, under the control of T12 pulses, received from the timing control circuit directly and through an OR gate 66. In one embodiment, the binary number comprises a sign bit position and seven magnitude positions so the memory 65 stores, for each carrier wave pulse, 256 8-bit words representing the 128 sine values and 128 cosine values.

After these binary numbers are stored for one pulse prior to the receipt of the first sine and cosine values for the first range bin of a successive carrier wave pulse, the timing and control circuit 21 transfers the sine and cosine values to an optional signal-to-noise detector 67 or to an accumulating memory 70 under the control of T12 and T13 signals from the timing control circuit 21 received through OR gates 68 and 71. If the detector 67 is not used, then, for each transmitted character, the memory must store the sine and cosine values for each range bin for each bit in the phase code sequence. Although the number of binary bits might be reduced to four, such a memory would require a location for each sine and cosine value in each of the 128 range bins for each of the 16 bits in the phase code sequence. Further, it would be necessary to correlate all the information in the memory 70 with all the 64 possible phase code sequences.

In accordance with another aspect of this invention, we reduce both these memory and correlation requirements by using the detector 67 to preselect a number (e.g., 32) range bins for correlation. As previously indicated, the transmitter generates a reference character each time the frequency of the carrier changes. As the clocks 30 (FIG. 1) and 63 (FIG. 4A) synchronize the timing circuits, the circuit 21 generates a corresponding SYNC signal. The detector 67 uses the received sine and cosine values for the character to establish the signal-to-noise ratio for each range bin of the reference character and selects some number of the ranges (e.g., 32), based upon the signal-to-noise ratios, as ranges to be stored. Thereafter, as the S/N ratio detector 67 receives the sine and cosine values in each range bin for the character code phase code sequences, it enables a writing operation of the memory only for the preselected ranges. Thus, the storage requirements for the memory 70 are reduced by using this technique.

If the memory 65 receives 8-bit binary numbers, the detector 67 uses this precision to determine the signal-to-noise ratios. However, this precision is not necessary in subsequent correlation, so the memory 70 need only store the sign bit and, for example, the three most significant magnitude bits.

Thus, the memory 70 stores all the sine and cosine values for all the transmitted carrier wave pulses in the preselected range bins for one character. It contains a block of 64 locations which correspond to each bit in the phase code sequence and which alternately store the sine and cosine numbers for each carrier wave pulse. Further, there are 16 such blocks, corresponding to the 16 bits in the phase code sequence for a character.

Figure 4B:
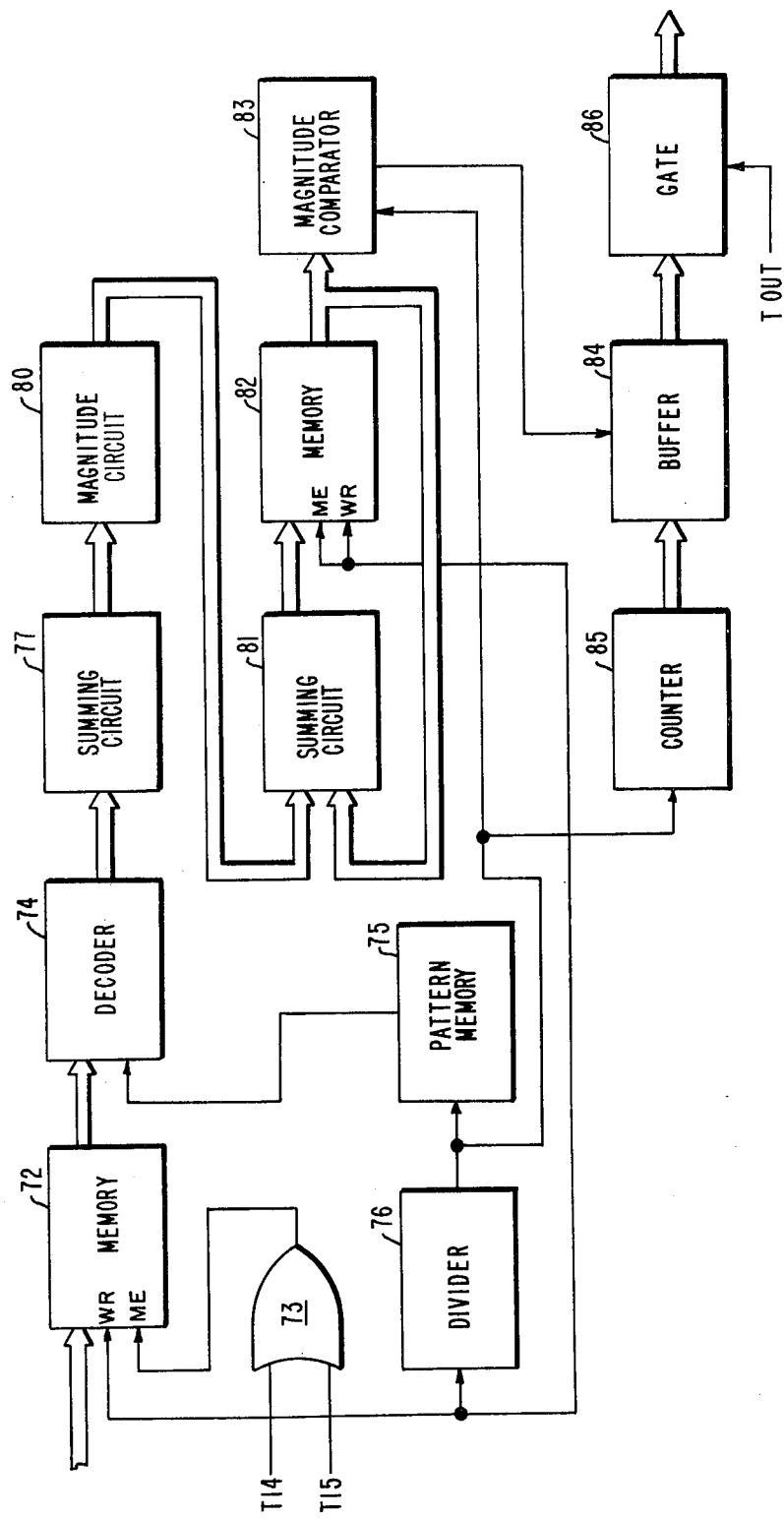

Thereafter, T14 pulses from the timing control circuit 21 pass through the OR gate 71 to the memory 70 and to a memory 72 in FIG. 4B through an OR gate 73 simultaneously to transfer and reorder the stored binary numbers. When the transfer operation is completed, the binary numbers are stored in blocks of 16 locations. Each block contains all the binary numbers which correspond to all the sine values for a character for one range bin or all the cosine values for a character for one range bin. Hence, the memory contains 64 blocks of 16 locations each. The first block, for example, contains all the sine values for the first range bin for each carrier wave pulse transmitted for one character. The second block contains all the cosine values for the first range bin; and the last two blocks contain, respectively, the sine values and the cosine values for the 32 range bin. This order facilitates subsquent processing in the correlation circuit 23 shown in FIG. 4B.

The correlation circuit 23 in FIG. 4B comprises a decoder 74 and a pattern memory 75 which stores the phase code sequences. This memory may have the same configuration as the encoder 14 in FIG. 2 or comprise a 16 bit × 64 word memory. In the following discussion we alter the meaning of "range bin" to distinguish each block of 16 locations in the memory 72 as a range bin, so the memory 72 stores 64 range bins. The correlation circuit 23 correlates all 64 of these range bins against each phase code sequence from the pattern memory 75.

More specifically, the T15 pulses from the timing control circuit 21 in FIG. 4A, pass through the OR gate 73 to advance the output from the memory in rapid succession. In addition, a divider 76, which divides by 64 in this specific embodiment, provides an input signal to the pattern memory 75 thereby to select a new sequence each time the memory 72 generates a set of 64 range bin values in sequence. Once a first phase code sequence is selected, the decoder 74 multiplies the sign bit from each value in the first range bin by a plus 1 or minus 1 depending upon the value in the corresponding phase code sequence bit position. A summing ciructi adds or subtracts the magnitude bits according to the multiplied sign bits to obtain, for that first range bin, a sum which a magnitude circuit 80 converts into a correlation coefficient for the range bin. This operation repeats for each range bin and the successive range bin correlation coefficients are accumulated in a summing circuit 81 and memory 82.

After averaging all range bins for one phase code sequence, the memory contains an average correlation coefficient for all the range bins for the selected character. Each average correlation coefficient is compared with the best prior average coefficient in a magnitude comparator 83. If the average correlation coefficient for a phase code sequence in memory 82 is greater than the stored average correlation coefficient, the magnitude comparator 83 gates a number into a buffer 84 from a counter 85. The number in the counter 85 is the address of the phase code sequence then being correlated and corresponds to the character code for that sequence.

As will now be apparent, after this correlation procedure for one phase code sequence iterates for all 64 possible sequences, the buffer 84 contains the character code which has the best average correlation coefficient. At this time the timing control circuit 21 in FIG. 4A generates a Tout signal which enables a gate 86 to transfer the character code from the buffer 84 to the message receiver 24 in FIG. 1.

FIG. 5 depicts a circuit which, with analogous circuits, can replace the decoder 74 and summing circuit 77 in FIG. 4B. The circuit in FIG. 5 receives the sign bits through a buffer 90. As each of the values in a range bin transfers to the buffer in succession from the memory 72 (FIG. 4B) successive CLK pulses, corresponding to the T15 pulses in FIG. 4B, are routed through multiplexers 91 and 92 to load the sign bits into corresponding flip-flops in a flip-flop register 93. When all the registers are loaded, the signals from a counter 94 identify one phase code sequence which read-only memories 95 store. The corresponding 16 sign bits pass to an array of EXCLUSIVE OR gates 96 for multiplication within the phase sequence code. In a summing network after summing each bit separately in circuits 97 and 98, the partial sums of each of the three bits are added in the proper weight and corrected by the content of the partial sum of the sign bits with the help of a PROM microcircuit.

In summary, there is described a data communications system for transferring data by means of highly noisy, variable delay propagation media. In accordance with this invention, the transmitter in FIGS. 1 and 2, or any equivalent transmitter, produces a modulated carrier wave which has frequency diversity. The receiver shown in FIGS. 1 and 4 receives an input signal which has both frequency and range diversity. Correlation circuits receive signals for various ranges and obtain, for each possible phase code sequence, an average coefficient for all range bins. The circuit then determines which sequence produces the best average correlation coefficient and this sequence is designated to indicate the transmitter character code and character.

A data communications system constructed in accordance with our invention has several advantages. It is extremely reliable because the communications medium need only be coherent for an extremely short time interval. The use of frequency and range diversity lends to the regular establishment of communications between two fixed locations on a reliable basis regardless of time or conditions. The carrier signal frequency can shift in a progression or in a random order, provided both the receiver and transmitter follow the same order. A random sequence does reduce interference with other ratio communications and unauthorized detection of the transmitted message.

Although this invention has been described with respect to a particular embodiment of separate transmitters and receivers, it will be apparent that many different types of transmitters, receivers and transceivers can be used to implement this invention for one-way or two-way communications. Other equivalent embodiments will be used for transmission with other propagation media. Thus, it is the object of the appended claims to cover all such variations and modifications as come within the true spirit and scope of this invention.

What we claim as now and desire to secure by Letters Patent of the United States is:

1. A communications system for transmitting a message including a plurality of characters through a highly noisy, variable delay propagation medium, said system comprising:
   A. a modulated carrier wave transmitter including:
      i. means responsive to each message character for establishing a corresponding multiple-bit phase code sequence,
      ii. means for generating a carrier wave which shifts from one frequency to another, and
      iii. means for phase-modulating the carrier wave in response to the phase code sequence thereby to transmit the modulated carrier wave with frequency diversity dependent upon the carrier wave frequency shifts to the propagation medium, and
   B. a receiver for recovering from the propagation medium the transmitted message, said receiver including:
      i. means for generating a carrier wave that shifts in frequency in synchronism with the carrier wave frequency shifts at said transmitter,
      ii. input means for generating a demodulated signal in response to the signal from said incoming modulated carrier wave,
      iii. detecting means for decoding the demodulated signal into a sequence of vector signals representing different predetermined range delays of the signal through the propagation medium, and
      iv. correlation means for generating a message character based upon the correlation of the detected vector signals and the multiple bit phase code sequences.

2. A communication system as recited in claim 1 wherein each character is identified by a character code with a fewer number of bit positions than in the corresponding phase code sequence, said phase code sequence establishment means in said transmitter including:
   i. means for storing the information for the plurality of phase code sequences, and
   ii. means responsive to each character code for retrieving from said storage means the corresponding one of the phase code sequences.

3. A communications system as recited in claim 2 wherein said storage means stores four multiple bit sequences and each bit position in the sequence is stored in an addressable location, said retrieving means including:
   i. a counter with a modulus corresponding to the number of bit positions in a phase code sequence,
   ii. means responsive to predetermined character code bit positions for presetting said counter,
   iii. means responsive to the other character code bits and the number in said counter for selecting a group of locations in said storage means, and
   iv. means for advancing said counter through one iteration thereby to retrieve from said storage means a phase code sequence corresponding to the character code.

4. A communications system as recited in claim 2 wherein said storage means contains a plurality of sequences, each such sequence having a zero correlation for the first three shifted positions of that sequence.

5. A communications system as recited in claim 2 wherein said phase modulating means comprises:
   a. a phase modulator for modulating the carrier wave in response to each bit in the phase code sequence, and
   b. an output amplifier for transmitting to the propagation medium, a chain of pulses with the common carrier frequency where the sign of the phase in the sequence of the pulse chain corresponds to the bit values in a phase code sequence.

6. A communications system as recited in claim 1 wherein said carrier wave generator in said transmitter and in said receiver each include:
   i. a frequency memory for generating a sequence of frequency selection signals, and
   ii. a variable frequency oscillator for generating a carrier wave with a frequency that shifts in response to the sequence of the frequency selection signals.

7. A communications system as recited in claim 6 additionally comprising a timing control circuit in said transmitter and in said receiver, said timing control circuits generating, in synchronism, signals to control said frequency memories thereby to maintain the frequency shifts in synchronism.

8. A communications system as recited in claim 6 wherein said receiver input means includes
   i. a carrier wave amplifier tuned in response to signals from said frequency memory, and
   ii. a plurality of intermediate frequency circuits.

9. A communications system as recited in claim 1 wherein:
   A. said transmitter modulating means includes pulsed amplifier means for transmitting a modulated carrier wave pulse to the propagation medium in response to each bit position in a phase code sequence,
   B. the input signal from said receiver input means in response to each modulated carrier wave pulse represents a plurality of reflected signals produced by variable range delays, C. said detecting means in said receiver obtains, for each modulated carrier wave pulse, vector signals for each range delay, D. said transmitter additionally comprises means responsive to said carrier wave generating means for producing a reference phase code sequence each time said carrier wave generating means shifts frequency, E. said receiver additionally comprises a detection circuit for determining the quality of the vector signals for a reference character corresponding to each range delay, thereby to preselect certain of the range delays, and F. means for storing the vector signals for subsequent characters transmitted at that carrier wave frequency only for the preselected range delays.

10. A communications system as recited in claim 1 wherein said correlation means includes:
  i. means for storing the phase code sequences,
  ii. means responsive to all the vector signals for a character for obtaining, for each phase code sequence, an average correlation coefficient for all range delays, and
  iii. means for selecting the phase code sequence from said memory which produces the greatest average correlation coefficient thereby to indicate the character.

11. A communications system as recited in claim 10 wherein said detector means transmits a plurality of sets of first and second quadrature signals, each set corresponding to a predetermined range delay for each bit in the phase code sequence.

12. A communications system as recited in claim 11 wherein said correlation means correlates all vector signals corresponding to a given range delay and averages the magnitude of the correlations for all range delays with respect to each phase code sequence.

13. A communications system as recited in claim 11 wherein said correlation means comprises:
  i. means for establishing a signal-to-noise ratio for each carrier wave frequency, and
  ii. means responsive to the signal-to-noise ratio for designating preselected range delays, and
  iii. means for storing the sequence of vector signals in the preselected range delays only, and
  iv. means for correlating, with respect to each phase code sequence, all the stored vectors corresponding to each predetermined range delay, thereby to obtain a range correlation coefficient for each range delay.

14. A communications system as recited in claim 13 additionally comprising means for obtaining the average of the magnitudes of each range correlation coefficient for each phase code sequence thereby to obtain an average correlation coefficient for each sequence.

* * * * *